United States Patent [19]

Schad

[11] Patent Number: 4,669,408
[45] Date of Patent: Jun. 2, 1987

[54] AMPHIBIOUS JET POWERED CRAFT

[76] Inventor: Robert D. Schad, 110 Bloor Street West, Suite 2104, Toronto, Ontario, Canada

[21] Appl. No.: 759,764

[22] Filed: Jul. 29, 1985

[51] Int. Cl.4 ............................................. B62B 15/00
[52] U.S. Cl. .................................... 114/43; 114/283; 114/284
[58] Field of Search ..................... 440/37; 114/40, 43, 114/274, 275, 276, 282, 283, 284, 285, 286; 244/106

[56] References Cited

U.S. PATENT DOCUMENTS

| 978,311 | 12/1910 | Lake | 114/285 |
|---|---|---|---|
| 1,868,054 | 7/1932 | Easthope | 114/286 |
| 2,165,633 | 7/1939 | Hunt | 114/43 |
| 2,320,574 | 6/1943 | Dornier | 244/106 |
| 2,601,836 | 7/1952 | Crewe | 244/106 |
| 2,753,135 | 7/1956 | Gouge | 244/106 |
| 3,435,795 | 4/1969 | Eckfield | 114/285 |
| 4,004,536 | 1/1977 | Bernier | 114/274 |
| 4,067,286 | 1/1978 | Stout et al. | 114/284 |
| 4,326,476 | 4/1982 | Pole | 114/40 |
| 4,369,725 | 1/1983 | Lord et al. | 114/40 |

FOREIGN PATENT DOCUMENTS

| 2554779 | 5/1985 | France | 114/284 |
|---|---|---|---|
| 474908 | 11/1937 | United Kingdom | 114/284 |

Primary Examiner—Joseph F. Peters, Jr.
Assistant Examiner—Thomas J. Brahan
Attorney, Agent, or Firm—Bachman & LaPointe

[57] ABSTRACT

A highly maneuverable amphibious craft useful for transportation over rotten ice, slush, snow, swamps, mud, short spans of lowland, rough seas, ships wakes, growlers and the like.

10 Claims, 4 Drawing Figures

AMPHIBIOUS JET POWERED CRAFT

BACKGROUND OF THE INVENTION

The present invention relates to mechanized vehicles and in particular to powered amphibious crafts. More particularly the invention relates to vehicles of the above class which are useful for transportation of cargo or personnel over a wide variety of surfaces.

Typical prior art crafts are disclosed and described in U.S. Pat. Nos. 4,351,262, Re. 31,563 and 4,458,622. The '262 patent shows a pair of fixed hull struts 13 and 15 straddling an adjustable central hull section 11 which is advanced and retracted by the expansion and contraction of an air chamber 27. The '563 patent shows hinged flaps 28 and 29 positioned between fixed skis 12 and 13 in one embodiment; a second embodiment shows retractible skis 42 with hinged flaps 28b and 29b. The flaps act as skis, walls to block spray or are fitted with dam elements to block spray depending upon the particular embodiment. The '622 patent shows a pair of retractable hull elements 8 at the stern of an inboard motor. While these prior art structures have utility they are designed for operation in conventional waterways such as inland, rivers, lakes, oanals and bodies of salt water.

SUMMARY OF THE INVENTION

In contrast to the above-identified prior art crafts, the present invention deals with an amphibious craft which is designed and constructed to provide effective transportation over a wide range of support surfaces, i.e., surfaces ranging from conventional waterways to rotten ice, slush, swamps, mud, short spans of land and arctic or antarctic ocean growlers.

A feature of the invention is the provision of a highly maneuverable hull structure having extensible hull portions which when extended reduce hull area in contact with a support surface.

A further feature of the invention is the provision of hull portions which are extensible laterally from a hull body to increase the effective width of the hull.

A further feature of the invention is the provision of a novel method of breaking a hull free from a frozen mass of ice, slush, mud or the like.

A still further feature of the invention is the provision of a hull structure which is operable to present minimum hull surface area when operating in contact with water, snow or slush.

A further feature of the invention is the provision of an airscrew powered hull structure which is adjustable to minimize leeway when effecting turns at high speeds.

An amphibious hull structure embracing certain principles of the present invention may comprise a hull body having an exterior working surface, motive power means supported by the hull body, said working surface having bilges defining a junction between a hull bottom portion and a hull side portion, said bilge further defining a movable hull section normally disposed flush with said exterior working surface and reciprocating power means for projecting said bilges beyond the hull body to reduce the effective area of said working surface.

A method of breaking the hull of an amphibious craft free of a frozen mass, embracing certain principles of the invention may comprise the step of:

providing a main hull body defining a generally continuous exterior surface or contour, providing segments of the hull body which are movable relative to the main hull body and projecting said segments beyond said surface effect to jack or raise the main body of the hull free of the frozen surface.

BRIEF DESCRIPTION OF THE DRAWINGS

Other features and advantages will become more apparent from an examination of the succeeding specification when read in conjunction with the appended drawings in which.

DETAILED DESCRIPTION

Figure 1:
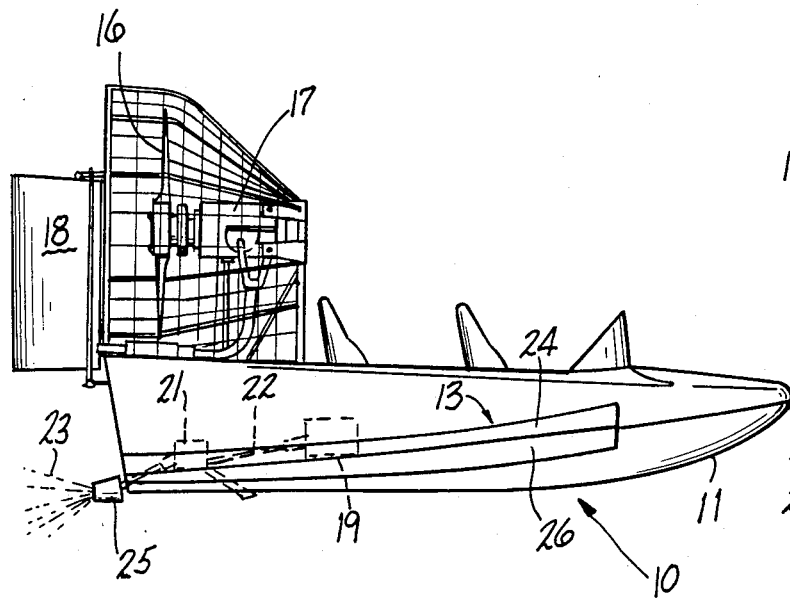
FIG. 1 is a side view of the amphibious craft.

Referring in detail to the drawings, an amphibious craft 10 comprises a main hull body 11, keel 12 and a pair of opposed bilges 13 and 14. The hull body includes flat side surfaces 20 and flat bottom surfaces 30 on either side of the keel. The craft is powered by the jet stream generated by an airscrew or propeller 16 driven by an internal combustion engine 17. Downstream of the airscrew is a rudder 18 for steering the craft in well known fashion Alternatively, and depending upon the environment of operation, the craft may be powered by an inboard internal combustion engine indicated in dotted lines at 19 (FIG. 1) driving a water pump 21 via shaft 22 developing a high velocity fluid jet stream 23 at nozzles 25 below and astern of the hull. In this case, the hull is steered by a conventional rudder, not shown, or by vectoring or aiming the jets to cast the stern of the craft in the desired direction according to well known principles.

Figure 2:
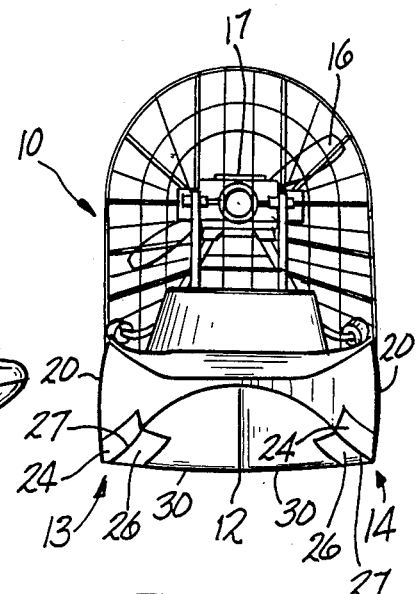
FIG. 2 is a front view of the craft.
Figure 3:
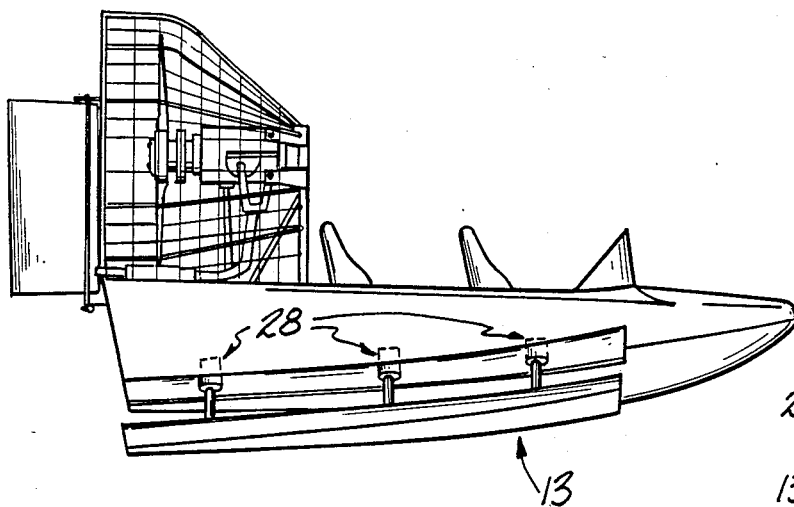
FIG. 3 is a view similar to FIG. 1 showing hull bilge portions extended.
Figure 4:
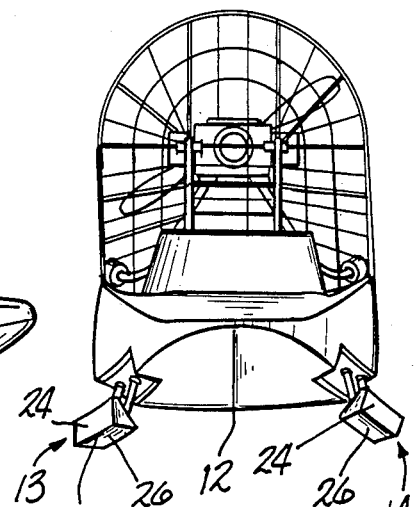
FIG. 4 is a front view of the illustration of FIG. 3.

The bilges 13 and 14 normally positioned flush with the hull body exterior as indicated in FIGS. 1 and 2, include a hull side portion 24 and a hull bottom portion 26 forming a junction at 27. The bilges are individually operable by conventional fluid piston-cylinder shock absorbing member 28 to move relative to the hull body outward from the position of FIG. 2 to the position of FIG. 4.

In slush or water mixed with ice or snow and at moderate to high speeds the bilges are extended to reduce hull surface area thereby reducing the hull area in contact with the support medium. In addition, the extended bilges act as leeboards minimizing leeway, reducing friction or hull drag and reducing the diameter of the turning circle substantially.

When maneuvering with airscrew propulsion in water mixed with ice and snow and in low atmospheric temperatures it is imperative to minimize hull surface area by extending the bilge portions. This reduces the surface to which frozen masses develop and reduces the load on the airscrew propulsion system.

In addition the shock absorbing capacity of the fluid piston cylinder mechanisms 28 minimize the transfer of vibrations from the extended bilge portion to the hull body and to the passengers.

In situations where the hull is moved in snow, a mixture of water, snow and ice or swamp muck with bilge portions retracted for an appreciable period at low temperatures the hull may become frozen to a solid mass. In such a situation, the bilge portions are individually operable (extensible) to rock or roll the hull from side to side to free it from the frozen mass.

In situations where the craft is operated solely in conventional waterways at above freezing temperature, the alternative underwater high velocity jet stream propulsion may be substituted for the airscrew as said jet propulsion is disclosed and described in said U.S. Pat. No. Re. 31,563.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A hull structure for a highly maneuverable amphibious craft useful for transportation over hull support surfaces such as rotten ice, slush, snow, swamps, short spans of lowland, rough seas, ships wakes, ocean growlers and the like comprising:

a hull body having an exterior working surface, motive power means supported by the hull body, said working surface having bilges defined a junction between a hull bottom portion and a hull side portion, each said bilge further defining a movable hull section normally disposed substantially flush with said exterior working surface and recessed therein, said movable hull section being co-extensive with that portion of the hull body which normally contacts said hull support surfaces and reciprocating power means for projecting said bilges beyond the hull body to reduce the effective area of said working surface and to increase the effective width of the hull.

2. The device of claim 1 in which the motive power means includes means for creating an external fluid jet stream.

3. The device of claim 2 in which the hull supports a rudder means downstream of said jet stream.

4. The device of claim 2 in which the motive power means is disposed above said working surface and includes means for creating an external fluid jet stream in the atmosphere.

5. The device of claim 2 in which the motive power means is disposed above said exterior working surface and includes means for creating a jet stream below said working surface.

6. The device of claim 1 including means for projecting one bilge independently of the other bilge.

7. The device of claim 6 in which the bilges are projected and supported by fluid powered shock absorbing reciprocating piston-cylinder devices.

8. The device of claim 1 wherein the hull body includes flat side and flat bottom surfaces.

9. The device of claim 1 in which said hull bottom portion and said hull side portion comprise two flat panels defining in cross-section a V-shaped configuration joined at the apex of the V.

10. The device of claim 1 wherein said reciprocating power means is operative to project the entire bilge beyond the hull body.

* * * * *